US009586461B2

(12) United States Patent
Okuda (10) Patent No.: US 9,586,461 B2
(45) Date of Patent: Mar. 7, 2017

(54) LIGHT-ADJUSTING-PANEL STRUCTURE

(71) Applicant: HONDA MOTOR CO., LTD., Tokyo (JP)

(72) Inventor: Yuichiro Okuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/785,463

(22) PCT Filed: Apr. 16, 2014

(86) PCT No.: PCT/JP2014/060790
§ 371 (c)(1),
(2) Date: Oct. 19, 2015

(87) PCT Pub. No.: WO2014/171470
PCT Pub. Date: Oct. 23, 2014

(65) Prior Publication Data
US 2016/0082812 A1 Mar. 24, 2016

(30) Foreign Application Priority Data

Apr. 19, 2013 (JP) .................................. 2013-088173

(51) Int. Cl.
*B60J 3/04* (2006.01)
*B60J 1/17* (2006.01)
(Continued)

(52) U.S. Cl.
CPC . *B60J 3/04* (2013.01); *B60J 1/17* (2013.01); *G02F 1/1339* (2013.01); *G02F 1/172* (2013.01); *G02F 1/1335* (2013.01)

(58) Field of Classification Search
CPC ..... B60J 3/04; B60J 1/17; G02F 1/172; G02F 1/1339; G02F 1/1335
(Continued)

(56) References Cited

U.S. PATENT DOCUMENTS 4,927,246 A * 5/1990 Ito .......................... G02F 1/1523
359/275
5,355,245 A * 10/1994 Lynam .................... B32B 17/10
359/267
(Continued)

FOREIGN PATENT DOCUMENTS

JP 61-129626 6/1986
JP 61-201216 9/1986
(Continued)

OTHER PUBLICATIONS

International Search Report, Date of Mailing: Jul. 15, 2014.

*Primary Examiner* — Jerry Redman
(74) *Attorney, Agent, or Firm* — Rankin, Hill & Clark LLP (57) ABSTRACT

In a light-adjusting-panel structure, a light-adjusting sheet is bonded, using a first adhesive, to the back surface of a first transparent panel. In this light-adjusting-panel structure, the end section of the light-adjusting sheet is drawn out to a position closer to the end section of the first transparent panel than the end surface of the first adhesive, in a direction along the panel surface of the first transparent panel. Further, the light-adjusting-panel structure covers the drawn-out end section and the end surface of the first adhesive, the light-adjusting-panel structure being provided with a seal material having lower moisture permeability than the first adhesive.

14 Claims, 4 Drawing Sheets

(51) Int. Cl.
*G02F 1/1339* (2006.01)
*G02F 1/17* (2006.01)
*G02F 1/1335* (2006.01)

(58) Field of Classification Search
USPC .......................................................... 49/501
See application file for complete search history.

(56) References Cited

U.S. PATENT DOCUMENTS

| | | | | |
|---|---|---|---|---|
| 5,604,626 | A * | 2/1997 | Teowee | B32B 17/10036 359/265 |
| 6,055,088 | A * | 4/2000 | Fix | B32B 17/10 359/265 |
| 6,934,067 | B2 * | 8/2005 | Ash | B60R 1/088 359/265 |
| 6,976,335 | B1 * | 12/2005 | Yoshizawa | B32B 17/10009 49/374 |
| 7,372,534 | B2 * | 5/2008 | Yano | B32B 17/10 349/149 |
| 7,436,482 | B2 * | 10/2008 | Yano | B32B 17/10 349/149 |
| 8,248,683 | B2 * | 8/2012 | Lee | G02F 1/0147 252/583 |
| 8,441,707 | B2 * | 5/2013 | Lam | G02B 5/23 359/241 |
| 8,863,759 | B2 * | 10/2014 | Kergosien | A45D 29/001 132/200 |
| 8,995,039 | B2 * | 3/2015 | Bartug | B32B 17/10036 359/245 |
| 9,176,357 | B2 * | 11/2015 | Lam | B60J 3/04 |
| 9,333,728 | B2 * | 5/2016 | Veerasamy | B32B 17/10 |
| 9,341,015 | B2 * | 5/2016 | Fernando | E06B 3/6775 |
| 2002/0005977 | A1 * | 1/2002 | Guarr | G02F 1/155 359/265 |
| 2007/0128905 | A1 * | 6/2007 | Speakman | H05K 1/0265 439/161 |
| 2007/0183066 | A1 * | 8/2007 | Varaprasad | B32B 17/06 359/844 |
| 2010/0045924 | A1 * | 2/2010 | Powers | G02B 5/23 349/190 |
| 2013/0050797 | A1 * | 2/2013 | Takahashi | B60J 3/04 359/245 |
| 2013/0229612 | A1 * | 9/2013 | Gayout | E06B 9/24 349/193 |
| 2014/0375915 | A1 * | 12/2014 | Zhang | B32B 17/10504 349/16 |
| 2015/0251588 | A1 * | 9/2015 | Salter | B60Q 1/268 362/510 |
| 2015/0277165 | A1 * | 10/2015 | Burrows | G02F 1/137 349/16 |
| 2015/0283937 | A1 * | 10/2015 | Salter | B60Q 1/268 362/510 |
| 2015/0370140 | A1 * | 12/2015 | Bertolini | B32B 17/10036 359/275 |
| 2016/0104437 | A1 * | 4/2016 | Iwakawa | G02B 6/0011 345/690 |
| 2016/0118416 | A1 * | 4/2016 | Yamazaki | H01L 27/1225 349/38 |

FOREIGN PATENT DOCUMENTS

| | | |
|---|---|---|
| JP | 03-290337 | 12/1991 |
| JP | 2511489 | 7/1996 |
| JP | 2011-524546 | 9/2011 |
| WO | 2009/153593 | 12/2009 |

* cited by examiner

FIG.1

LIGHT-ADJUSTING-PANEL STRUCTURE

TECHNICAL FIELD

The present invention relates to a light-adjusting panel having a transparent panel and a light-adjusting sheet bonded thereto for electrically adjusting an external light.

BACKGROUND ART

Recently proposed window glass panes or sheets for use on such vehicles as automobiles include a light-adjusting panel structure for electrically adjusting an external light by applying voltage to a light-adjusting element housed in the light-adjusting panel structure.

The light-adjusting panel structure comprises a pair of glass panes each having an intermediate film laminated on opposed surfaces and a light-adjusting element laminated between the intermediate films via an electrode layer. A light-adjusting sheet is provided by laminating the pair of electrode layers and the light-adjusting element. End part of the light-adjusting sheet covered with a tape-form film so as to have a substantially U-shaped cross section.

By covering the end part with the tape-form film, entry of a plasticizer contained in the intermediate films can be prevented from entering the light-adjusting element. By prevention f entry of the plasticizer into the light-adjusting element, it is possible to prevent function deterioration by the plasticizer of the light-adjusting element. As the light-adjusting element, a liquid crystal, a Suspended Particle Device (SPD) may be adopted (see Patent Literature 1).

In the light-adjusting panel structure of Patent Literature 1, however, because the end part of the light adjusting sheet is covered by the tape-form film into a U-shaped cross-section, the tape-form film is stuck along a peripheral edge part (front surface). Thus, the opposite ends of the tape-form film bonded along the peripheral edge of the light-adjusting sheet can be seen from outside, whereby the aesthetic appearance of the panel structure may be injured.

Further, since only the end part of the light-adjusting sheet is covered by the tape-form film, the pair of glass panes laminated on both surfaces of the light-adjusting sheet is not covered by the tape-form film. Thus, the pair of glass panes is bonded to both surfaces of the light-adjusting sheet vi the intermediate film only. Hence, as a load acted on the glass panes in a direction of peel from the light-adjusting sheet, the acted load must be borne or supported by the light-adjusting sheet alone. But the support may not be sufficient.

In one known light-adjusting panel structure, a glass sheet is bonded to each of opposite surfaces of a light-adjusting sheet via an adhesive such that the end surfaces of the light-adjusting sheet, adhesive and the glass panes are formed flat and covered with a seal material. Specifically, the entire areas of the end parts of the light-adjusting sheet, the adhesive and the glass panes (namely, only the end surface of the light-adjusting panel structure) are coated with the seal material (see, e.g., Patent Literature 2).

By coating the entire end surfaces of the light-adjusting sheet, the adhesive and the glass panes with the seal material, the plasticizer contained in the adhesive can be prevented from entering the light-adjusting element. By coating the seal material only to the end surface of the light-adjusting panel structure, there is no fear of the seal material being seen from outside. Note also that, by coating the seal material to each entire end surface of the light-adjusting sheet, the adhesive and the glass panes, it is possible to bear with the adhesive a load acted in a direction to tear the glass panes off from the light-adjusting sheet.

However, in the light-adjusting panel structure of Patent Literature 2, the seal material is applied to the end surface of the light-adjusting sheet (namely, light-adjusting element). Thus, there is a fear that a plasticizer contained in the seal material will enter the light-adjusting element. Note also that since each end surface of the adhesive and the glass sheets is formed flat, the end surfaces of the adhesive and the glass sheets are disposed closely to each other. Thus, when a gap arises between the end surface of the light-adjusting sheet and the seal material, the plasticizer contained in the adhesive is liable to enter the light-adjusting element.

PRIOR ART LITERATURE

Patent Literature

Patent Literature 1: JP-A 2011-524546
Patent Literature 2: JP-A S61-201216

SUMMARY OF INVENTION

Problem to be Solved

It is therefore an object of the present invention to provide a light-adjusting panel structure capable of preventing entry of moisture and a plasticizer into a light-adjusting sheet while maintaining desired appearance thereof.

Solution to Problem

According to an aspect of the present invention, there is provided a light-adjusting panel structure including a transparent panel with a light-adjusting sheet bonded to a back surface of the transparent panel, characterized in that the light-adjusting sheet has an end part protruding, in a direction along a panel surface forming a front surface of the transparent panel, to a position closer to an end part of the transparent panel than an end surface of the adhesive, and the protruded end part and the end surface of the adhesive are covered by a seal material having moisture permeability lower than that of the adhesive.

According to another aspect of the present invention, there is provided a light-adjusting panel structure including a transparent panel with a light-adjusting sheet bonded to a back surface of the transparent panel, characterized in that the light-adjusting sheet has an end part protruding, in a direction along a panel surface forming a front surface of the transparent panel, to a position closer to an end part of the transparent panel than an end surface of the adhesive, and the protruded end part and the end surface of the adhesive are covered by a seal material containing a plasticizer of molecular weight higher than that of the adhesive.

Preferably, a separate transparent panel is bonded, via a separate adhesive, to that surface of the light-adjusting sheet which is opposite from one surface to which the transparent panel is bonded, and the end part of the light-adjusting sheet protrudes, in a direction along the panel surface of the transparent panel, to a position closer to an end part of the transparent panel than an end surface of the separate adhesive.

Preferably, the seal material bonds the transparent panel and the separate transparent panel together.

It is preferred that the transparent panel include: a first adhesive surface placed in contact with the adhesive that bonds the transparent panel to the light-adjusting sheet; and a first inclined surface inclining more toward the panel surface of the transparent panel as the first inclined surface extends toward the end surface of the transparent panel; the separate transparent panel include: a second adhesive surface placed in contact with the separate adhesive bonding the separate transparent panel to the light-adjusting sheet; and a second inclined surface inclining more toward the panel surface of the separate transparent panel as the second inclined surface extends toward the end surface of the separate transparent panel; and the first inclined surface and the second inclined surface be disposed in opposed relation to each other, the seal material being filled between the first and second inclined surfaces.

Preferably, the transparent panel includes a first outer end surface extending, in a direction normal to the panel surface of the transparent panel, from the end part of the first inclined surface away from the first adhesive surface and, in a direction along the panel surface of the transparent panel, closer toward the first adhesive surface, while the separate transparent panel includes a second outer end surface extending, in a direction normal to the panel surface of the separate transparent panel, from the end part of the second inclined surface away from the second adhesive surface and, in a direction along the panel surface of the separate transparent panel, closer toward the second adhesive surface. The first outer end surface and the second outer end surface may be coated with the seal material.

It is preferred that the transparent panel be supported at a window opening part of a vehicle in such a manner as to be slidable along the window opening part for opening/closing the window opening part and the end part of the transparent panel be provided at a closure part which, in a state of the window opening part being opened, stays away from the window opening part and, in a state of the window opening part being closed, is stored within the window opening part.

Advantageous Effects of Invention

In the invention, the end part of the light-adjusting sheet and the end surface of the adhesive is covered with the seal material having moisture permeability (good water-cutoff-performance) lower than that of the adhesive. By virtue of the adoption of the seal material having a low moisture permeability (property of absorbing moisture such as vapor (gas phase moisture contained in air) and rainwater), the seal material exhibits better water-cutoff performance than the adhesive. Consequently, it becomes possible to prevent moisture present in the outside of the light-adjusting panel structure from entering inside through the end part of the light-adjusting sheet.

Additionally, the end part of the light-adjusting sheet is caused to protrude beyond the end surface of the adhesive. Thus, it is possible to position the end surface of the light-adjusting sheet away from the end surface of the adhesive toward the end part of the transparent panel. As a result, by covering the end part of the light-adjusting sheet and the end surface of the adhesive with the seal material, moisture contained in the adhesive can be prevented from entering inside through the end part of the light-adjusting sheet. By thus preventing entry of the moisture present outside of the light-adjusting panel structure and moisture contained in the adhesive into inside through the end part of the light-adjusting sheet, entry of moisture into the light-adjusting sheet can be prevented effectively.

In addition, the end part of the light-adjusting sheet is arranged to protrude toward the end part of the transparent panel. Thus, it is possible to laminate the light-adjusting sheet up to the end part of the transparent panel. The seal material is formed of a transparent sealer similarly to the adhesive. Thus, the end part of the light-adjusting sheet covered with the seal material can be used as a part capable of adjusting external light similarly to other parts of the light-adjusting sheet. This makes it possible to expand a light-adjusting range (namely, visible range) up to the end part of the transparent panel and hence to obtain a desired range of field of vision.

Covering the end part of the light-adjusting sheet and the end surface of the adhesive by the seal material makes it unnecessary to cover the end surface to the front surface side of the light-adjusting sheet with a tape-form film. As a result, there is no fear of the tape-form film being seen from outside, whereby the light-adjusting panel structure can retain good external appearance.

In a preferred form of the invention, the end part of the light-adjusting sheet is covered with the seal material containing a plasticizer of molecular weight higher than that of the adhesive. By adoption of the seal material containing the higher-molecular-weight plasticizer, the plasticizer contained in the seal material can be rendered difficult to move. As a result, the plasticizer contained in the seal material can hardly enter inside through the end part of the light-adjusting sheet. Note that plasticizers are such materials as to be added to polymers so as to impart plastic pliability to end products and render the latter easy to process.

Note also that the end part of the light-adjusting sheet protrudes beyond the end surface of the adhesive. It thus becomes possible to space the end surface of the light-adjusting sheet from the end surface of the adhesive toward the end part of the transparent panel. Thus, by covering the end part of the light-adjusting sheet and the end surface of the adhesive with the seal material, it becomes possible to prevent the plasticizer contained in the adhesive from entering inside of the light-adjusting sheet through the end part of the latter.

In a further preferred form of the invention, the end part of the light-adjusting sheet is arranged to protrude beyond the end surface of the adhesive for bonding the separate transparent panel toward the end part of the separate transparent panel. As a result, it becomes possible to space the end surface of the light-adjusting sheet from the end surface of the adhesive for boding the separate transparent panel toward the end part of the separate transparent panel. Consequently, the moisture contained in the adhesive and the plasticizer can be prevented from entering into the inside of the light-adjusting sheet through the end part of the latter.

In a further preferred form of the invention, the transparent panel and the separate transparent panel are bonded together with the seal material. Note that one transparent panel is laminated on each surface of the light-adjusting sheet via an adhesive. In this state, when a load is applied to the transparent panel in a direction away from the light-adjusting sheet, it may be difficult to bear the applied load by the light-adjusting sheet alone.

To this end, the transparent panel and the separate transparent panel are bondfrf together via the adhesive. This makes it possible to, when a load is applied to the transparent panel and the separate transparent panel in a direction away from the light-adjusting sheet, bear the load with the seal material. Consequently, the light-adjusting sheet can be kept in good condition with the transparent panels laminated on both surfaces thereof.

In a further preferred form of the invention, the transparent panel is provided with the first inclined surface while the separate transparent panel is provided with the second inclined surface. As a result, the large opening part is defined by the first and second inclines surfaces. This makes it possible to easily supply the seal material to between the first and second inclined surfaces through the opening part, thus improving the pertinent coating operation.

By thus providing the first inclined surface to the transparent panel and the second inclined surface to the separate transparent panel, a large area for coating the seal material is obtained. As a result, it becomes possible to improve the adhesive performance of the adhesive required between the first and second inclined surfaces, whereby the transparent panel and the separate transparent panel can be maintained in a suitably bonded state via the adhesive.

By providing the first outer end surface to the end part of the first inclined surface, it becomes possible to position the first outer end surface outside the first inclined surface. Similarly, by providing the second outer end surface to the end part of the second inclined surface, it becomes possible to position the second outer end surface outside the second inclined surface. Further, the first and second outer end surfaces are coated with the seal material.

Consequently, it becomes possible to cause the seal material to flow from the first inclined surface round to the first outer end surface and to flow from the second inclined surface round to the second outer end surface. As a result, when a load is applied to the transparent panel and the separate transparent panel in a direction away from the light-adjusting sheet, the applied load can be borne suitably by the seal material.

In a still further preferred form of the invention, the end part is provided to the closure part of the transparent panel. By provision of the end part to the closure part, it becomes possible for the light-adjusting sheet end part to protrude up to the vicinity of the closure part. As a result, in the state in which the window opening part is opened and the closure part of the transparent panel is positioned away and exposed from the window opening part, the light-adjusting range (visible range) can be expanded as far as the vicinity of the transparent panel. This improves the aesthetic appearance of the transparent panel upon light-adjustment effected by the light-adjusting sheet.

MODE FOR CARRYING OUT INVENTION

Best mode for carrying out the present invention will be described below with reference to the accompanying drawings.

Embodiment

Description will be made now as to a light-adjusting (light-controlling) panel structure 30 according to the inventive embodiment.

Figure 1:
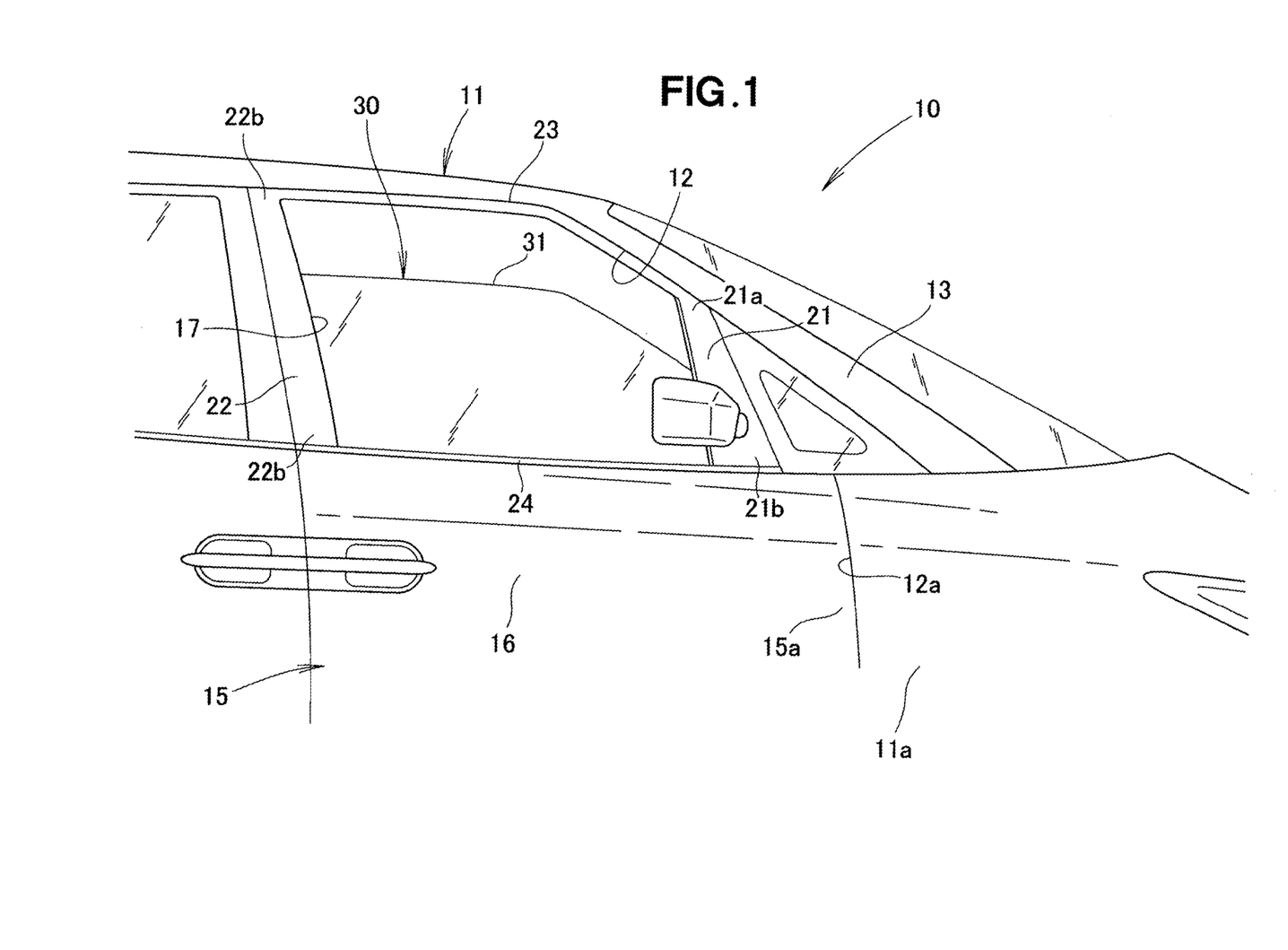
FIG. 1 is a perspective view illustrating a vehicle employing a light-adjusting-panel structure according to the present invention.

As shown in FIG. 1, a vehicle 10 includes a vehicle body 11 having a door opening 12 provided on right front side part 11a thereof and a side door 15 provided in the door opening 12. The side door 15 has a front end part 15a pivotally supported at a front part 12a of the door opening 12. The side door 15 comprises a door body 16 having a door glass pane (light-adjusting panel structure) 30 vertically movably supported at a window opening part 17 of the door opening 12.

The window opening part 17 is comprised of a front sash 21 provided rearward of a front pillar 13 in a vehicle body length direction and extending vertically, a rear sash 22 provided rearward of the front sash 21 in the vehicle body length direction and extending vertically, an upper sash 23 extending between an upper end part 21a of the front sash 21 and an upper end part 22a of the rear sash 22, and a lower sash 24 supporting a lower end part 21b of the front sash 21 and a lower end part 22b of the rear sash 22. The front sash 21, the rear sash 22, the upper sash 23, and the lower sash 24 thus jointly form the window opening framework.

Figure 2:
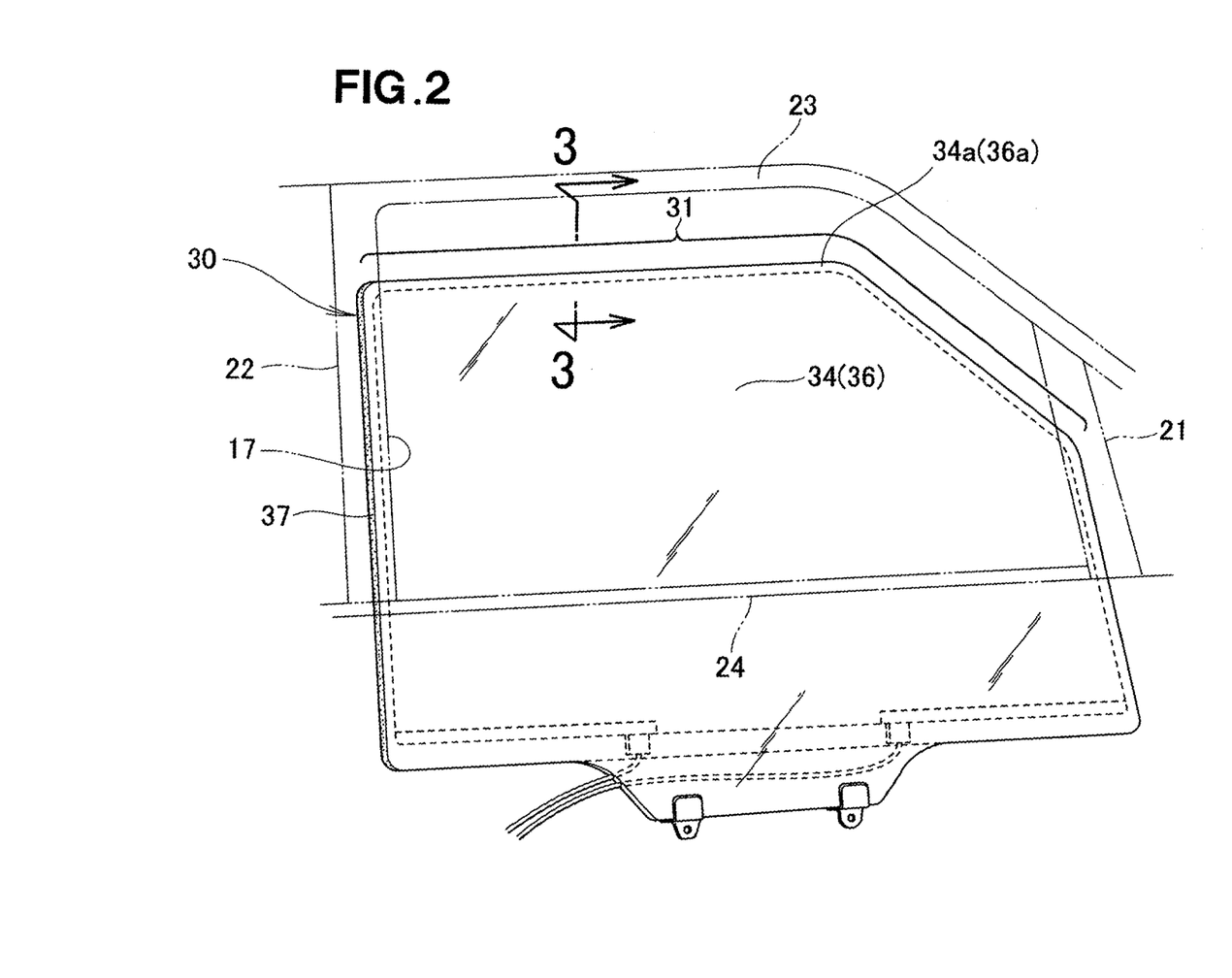
FIG. 2 is a perspective view illustrating the light-adjusting-panel structure of the present invention.

As shown in FIG. 2, a door glass pane 30 is supported vertically slide-movably along the front sash 21 and the rear sash 22 of the window opening part 17. The window opening part 17 is opened and closed by vertical slide-movement of the door glass pane 30 along the front sash 21 and the rear sash 22. The door glass pane 30 has a closure part 31 at an upper edge thereof. The closure part 31 of the door glass pane 30 stays away from the upper sash 23 when the window opening part 17 is opened and is stored within the upper sash 23 when the window opening part 17 is closed.

Figure 3:
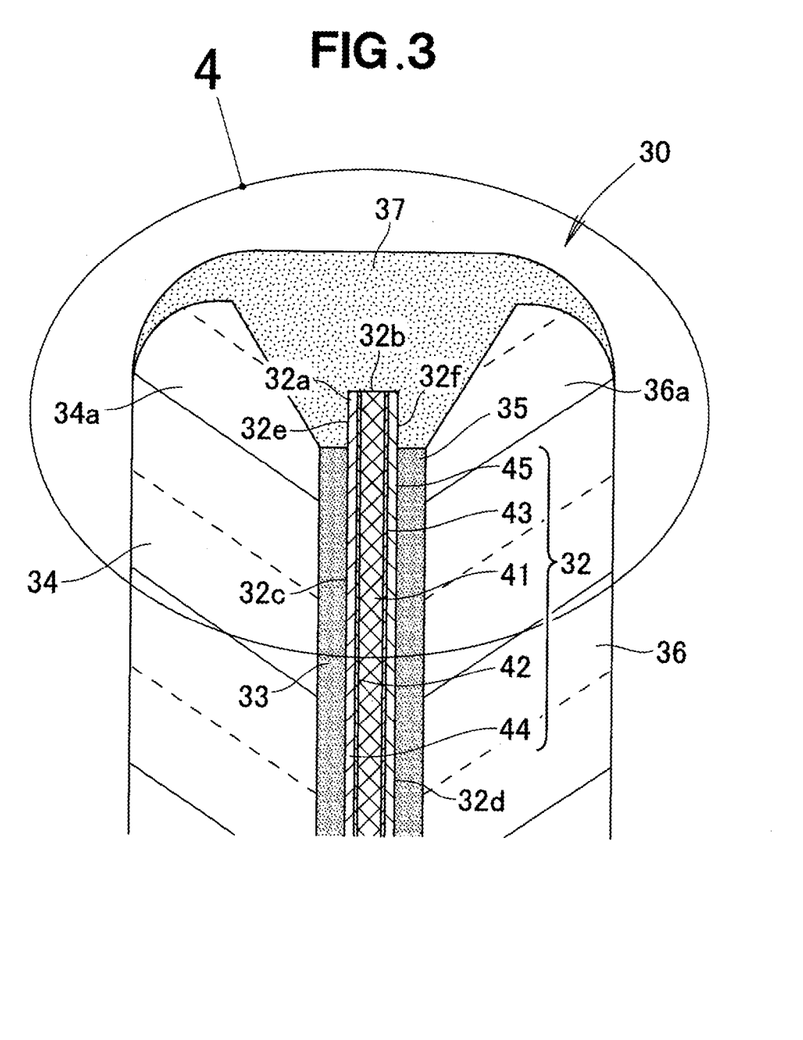
FIG. 3 is a cross-sectional view taken along line 3-3 of FIG. 2.

As shown in FIG. 3, the door glass pane 30 includes a light-adjusting sheet 32 capable of electrically adjusting an external light, a first adhesive 33 provided on one surface 32c of the light-adjusting sheet 32, and a first transparent panel 34 bonded, via the first adhesive 33, to the one surface 32c of the light-adjusting sheet 32.

The door glass pane 30 also includes a second adhesive 35 provided on an opposite surface 32d of the light-adjusting sheet 32, a second transparent panel 36 bonded, via the second adhesive 35, to the opposite surface 32d of the light-adjusting sheet 32, and a seal material 37 covering an end part 34a of the first transparent panel 34 and an end part 36a of the second transparent panel 36. Namely, the door glass pane 30 comprises a laminated glass pane formed of the light-adjusting sheet 32 with the first and second transparent panels 34, 36 laminated to opposite surface of the latter. The opposite surface 32d of the light-adjusting sheet 32 is located oppositely from the one surface 32c of the light-adjusting sheet 32.

Figure 4:
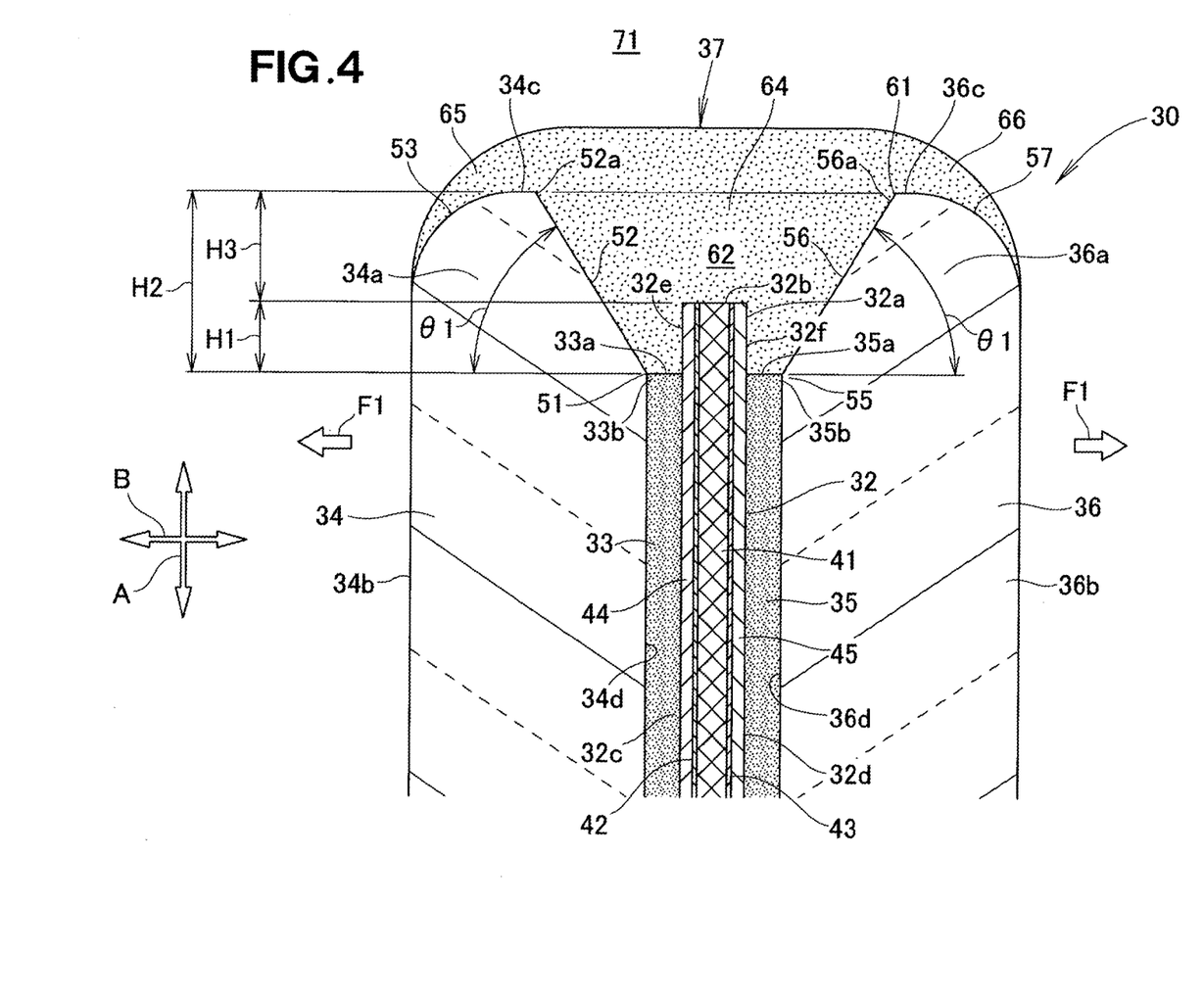
FIG. 4 is a view illustrating on an enlarged scale an encircled part 4 of FIG. 3.

The light-adjusting sheet 32 is comprised of a light-adjusting layer 41, a first transparent electrode layer 42 laminated to one surface of the light-adjusting layer 41, a first PET (polyethylene terephthalate) film 44 laminated to the first transparent electrode layer 42, a second transparent electrode layer 43 laminated to an opposite surface of the light-adjusting layer 41, and a second PET film 45 laminated to the second transparent electrode layer 43. The light-adjusting layer 41 is comprised of light-adjusting elements such as SPD and liquid crystal The end part 32a of the light-adjusting sheet 32 has an end surface 32b, a surface 32e of the one surface 32c, which is proximate to the surface 32b, and a surface 32f of the opposite surface 32d, which is proximate to the end surface 32b. As shown in FIG. 4, the end part 32a of the light-adjusting sheet 32 projects or protrudes from an end part 33a of the first adhesive 33a protrusion dimension H1 in a direction, as shown by arrow A, along a panel surface 34b of the first transparent panel 34. Namely, the end surface 32a of the light-adjusting sheet 32 protrudes further than the end surface 33a of the first adhesive 33 toward the end part 34a of the first transparent panel 34. The panel surface 34b of the first transparent panel 34 forms the general or largest surface of the first transparent panel 34.

Note also that the end part 32a of the light-adjusting sheet 32 protrudes from an end surface 35a of the second adhesive 35 the protrusion dimension H1 in the direction, as shown by arrow A, along a panel surface 36b of the second transparent panel 36. Namely, the end part 32a of the light-adjusting sheet 32 protrudes further than the end surface 35a of the second adhesive 35 toward the end part 36a of the second transparent panel 36. The panel surface 36b of the second transparent panel 36 forms the general or largest surface of the second transparent panel 36.

End surface 34c of the first transparent panel 34 is disposed to be flush with an end surface 36c of the second transparent panel 36. Similarly, the end surface 33a of the first adhesive 33 is disposed to be flush with the end surface 35a of the second adhesive 35.

The first adhesive 33 is laminated between the first transparent panel 34 and the light-adjusting sheet 32. The first adhesive 33 may be formed of a transparent resin such as polyvinyl butylal (PVB) resin and has moisture permeability (property of absorbing moisture such as vapor (gas phase moisture contained in air) and rainwater) higher than that of the seal material 37 as well as adhesiveness. The first adhesive 33 contains a polymer added with a plasticizer. With the plasticizer included, the first adhesive 33 is imparted with satisfactory plastic flexibility.

The second adhesive 35 is laminated between the second transparent panel 36 and the light-adjusting sheet 32. Similarly to the first adhesive 33, the second adhesive 35 is formed of transparent resin such as polyvinyl butylal (PVB) resin and has moisture permeability (property of absorbing moisture such as vapor (gas phase moisture contained in air) and rainwater) higher than that of the seal material 37 as well as adhesiveness. Similarly to the first adhesive 33, the second adhesive 35 contains a polymer added with a plasticizer. With the plasticizer included, the second adhesive 35 is imparted with satisfactory plastic flexibility.

The first transparent panel 34 is comprised of, e.g., a transparent sheet glass (specifically, curved sheet glass). The first transparent panel 34 has a back surface 34d bonded via the first adhesive 33 to the one surface 32c of the light-adjusting sheet 32. End part 34a of the first transparent panel 34 has a first adhesive surface 51 placed in contact with an end surface corner part 33b of the first adhesive, a first inclined surface 52 protruding from the first adhesive surface 51, and a first outer end surface 53 provided on the first inclined surface 52.

The first inclined surface 52 extends between the first adhesive surface 51 and the end surface 34c of the first transparent panel 34 such that it is inclined an angle θ1 toward the panel surface 34b of the first transparent panel 34. In FIG. 4, arrowed direction A corresponds a direction toward the panel surface 34b of the first transparent panel 34 while arrowed direction B corresponds to a direction normal to the panel surface 34b of the first transparent panel 34. The first outer end surface 53 is provided in a curved fashion by causing it to extend, in arrowed direction B, from an end part 52a of the first inclined surface 52 away from the first adhesive surface 51 and, in arrowed direction A, to approach the first adhesive surface 51.

Thus, the first outer end surface 53 is curved or inclined toward the panel surface 34b of the first transparent panel 34 relative to the first inclined surface 52. The end part 34a of the first transparent panel 34 is formed into a V-shape jointly by the first inclined surface 52 and the first outer end surface 53, the first outer end surface 53 being positioned outside the first inclined surface 52. The end surface 34c of the first transparent panel 34 is positioned at the peak of the V-shape.

Similarly to the first transparent panel 34, the second transparent panel 36 is comprised of, e.g., a transparent glass sheet (specifically, a curved sheet glass) whose back surface 36d is bonded via the second adhesive 35 to the opposite surface 32d of the light-adjusting sheet 32. The end part 36a of the second transparent panel 36 includes a second adhesive surface 55 held in contact with an end surface corner part 35b, a second inclined surface 56 projecting from the second adhesive surface 55, and a second outer end surface 57 provided on the second inclined surface 56.

The second inclined surface 56 is provides symmetrically with the first transparent panel 34 relative to the light-adjusting sheet 32. Namely, the second inclined surface 56 extends between the second adhesive surface 55 and the end surface 36c of the second transparent panel 36 such that it is inclined an angle θ1 toward the panel surface 36b of the second transparent panel 36. The first inclined surface 52 and the second inclined surface 56 are provided in opposed relation to each other. By thus arranging the first inclined surface 52 and the second inclined surface 56 to oppose with each other, an opening 61 is provided. The opening 61 is rendered relatively large in that the first inclined surface 52 and the second inclined surface 56 diverge gradually toward the end surface 34c of the first transparent panel 34 and the end surface 36c of the second transparent panel 36. Space 62 continuing with the opening 61 is defined by the first inclined surface 52 and the second inclines surface 56 such that the end part 32a of the light-adjusting sheet 32, the end surface 33a of the first adhesive 33 and the end surface 35a of the second adhesive 35 are exposed to the space 62.

The second outer end surface 57 is provided symmetrically with the first outer end surface 53 relative to the light-adjusting sheet 32. In FIG. 4, arrowed direction A corresponds a direction toward the panel surface 36b of the second transparent panel 36 while arrowed direction B corresponds to a direction normal to the panel surface 36b of the second transparent panel 36. The second outer end surface 57 is provided in a curved fashion by causing it to extend, in arrowed direction B, from an end part 56a of the second inclined surface 52 away from the second adhesive surface 55 and, in arrowed direction A, to approach the second adhesive surface 55.

Thus, the second outer end surface 57 is curved or inclined toward the panel surface 36b of the second transparent panel 36 relative to the second inclined surface 56. The end part 36a of the second transparent panel 36 is formed into a V-shape jointly by the second inclined surface 56 and the second outer end surface 57, the second outer end surface 57 being positioned externally of the second inclined surface 56. The end surface 36c of the second transparent panel 36 is positioned at the peak of the V-shape.

The end surface 34c of the first transparent panel 34 and the end surface 36c of the second transparent panel 36 are flush with each other and protrude a protrusion dimension H2 outward from the end surface 33a of the first adhesive 33 and the end surface 35a of the second adhesive 35. Each of the end surfaces 34c, 36c protrudes a protrusion dimension H3 from the end surface 32b of the light-adjusting sheet 32.

Also note that the end part 34a of the first transparent panel 34 and the end part 36a of the second transparent panel 36 covered with a seal material 37. An inner or internal seal material 64 is poured into the space 62 through the opening 61 between the first inclined surface 52 and the second inclined surface 56. A first outer seal material 65 is coated onto the first outer end surface 53 while a second outer seal material 66 is coated onto the second outer end surface 57. The inner seal material 64, the first outer seal material 65 and the second outer seal material 66 are formed integrally.

The inner seal material 64 is formed into a configuration of substantially inverted trapezoidal cross section and is bonded or coated onto the first inclined surface 52, the second inclined surface 56, the end part 32*a* of the light-adjusting sheet 32, the end surface 33*a* of the first adhesive 33, and the end surface 35*a* of the second adhesive 35. The end part 32*a* or the end surface 32*b* of the light-adjusting sheet 32 is covered with the inner seal material 64. This causes the inner seal material 64 to encapsulate the light-adjusting layer 41 between the first PET film 44 and the second PET film 45.

Note also that the first inclined surface 52 and the second inclines surface 56 are bonded together by the inner seal material 64 (or seal material 37). Namely, the first transparent panel 34 and the second transparent panel 36 are bonded together by the seal material 37.

The first transparent panel 34 is laminated onto the one surface 32*c* of the light-adjusting sheet 32 via the first adhesive material 33 while the second transparent panel 36 is laminated onto the opposite surface 32*d* of the light-adjusting sheet 32 via the second adhesive 35. In this state, when a load F1 acts on the first and second transparent panels 34, 36 in a direction away from light-adjusting sheet 32, it may be difficult for the light-adjusting sheet 32 alone to bear the acted load F1.

To this end, the end part 34*a* of the first transparent panel 34 and the end part 36*a* of the second transparent panel 36 are bonded together by means of the seal material 37. Thus, when the load F1 acted on the first transparent panel 34 and the second transparent panel 36 in a direction away from the light-adjusting sheet 32, the acted load F1 can be borne by the seal material 37. As a result, it becomes possible to keep the first transparent panel 34 and the second transparent panel 36 in good laminated state with respective to the light-adjusting sheet 32.

The seal material 37 may be a urethane-based or transparent silicone-based sealer such as a PENGUIN SEAL™ available from Sunstar Engineering Inc., and a HAMA-TITE™ WS-222 available from Yokohama Rubber Co. having a tensile strength of 0.5 MPa or larger. The seal material 37 is adjusted in contents so as to have an adhesive force of 0.5 MPa or larger relative to the end part 34*a* of the first transparent panel 34 and the end part 36*a* of the second transparent panel 36.

Alternatively, there may be applied a primer layer between the seal material 37 and the end part 34*a* and between the seal material 37 and the end part 36*a* so as to impart the respective primer layers an adhesive force of 0.5 MPa or larger. The primer layer may be a primer material for glass, e.g., an MS-90™ available from Yokohama Rubber Co.

The first inclined surface 52 and the second inclined surface 56 extend in a diverging fashion toward outside so as to define the large opening 61. As a result, it becomes possible for the inner seal material 64 to be fed into the space 62 through the opening 61 between the first and second inclined surfaces 52, 56, whereby efficiency of work of application of the seal material 37 is improved.

Since the first transparent panel 34 is provided with the first inclined surface 52 in an inclined fashion while the second transparent panel 36 is provided with the second inclined surface 56 in an inclined fashion, it becomes possible for the first and second inclined surfaces to have large areas, whereby a large area is provided for application or coating of the inner or internal seal material 64. This makes it possible to increase adhesion via the internal seal material 64 (37) between the first inclined surface 52 and the second inclined surface 56 and hence to keep the first and second inclined surfaces 52, 56 in a bonded state with desired firmness.

The first outer seal material 65 is applied to the first outer end surface 53 while the second outer seal material 66 is applied to the second outer end surface 57. The first outer seal material 65 and the second outer seal material 66 are formed integrally with the inner seal material 64. The first outer end surface 53 is positioned externally of the first inclined surface 52 while the second outer end surface 57 is positioned externally of the second inclined surface 56.

By application of the first outer seal material 65 to the first outer end surface 53, the seal material 37 flows from the first inclined surface 52 round in a curved fashion to the first outer end surface 53. By application of the second outer material 66 to the second outer end surface 57, the seal material 37 flows from the second inclined surface 56 round in a curved fashion to the second outer end surface 57.

Consequently, the end part 34*a* of the first transparent panel 34 and the end part 36*a* of the second transparent panel 36 are bonded together firmly via the seal material 37. As a result, when the load F1 acted on the first light-adjusting panel 34 and the second light-adjusting panel 36 in a direction away from the light-adjusting sheet 32, the acted load F1 can be sufficiently borne by the seal material 37.

The seal material 37 may be a urethane- or silicone-based transparent sealer having a moisture permeability lower than that of the first adhesive 33 and the second adhesive 35 and containing a plasticizer of molecular weight higher than those of the first adhesive 33 and the second adhesive 35. Adoption of a seal material, as the seal material 37, having a low moisture permeability (property of absorbing moisture such as vapor (gas phase moisture contained in air) and rainwater) makes it possible for the seal material 37 to exhibit water-cutoff performance better than those of the first adhesive 33 and the second adhesive 35. Consequently, it becomes possible to prevent, with the seal material 37, the moisture present at an outside 71 of the door glass pane 30 from entering inside through the end part 32*a* (more specifically, the end part 32*b*) of the light-adjusting sheet 32.

Further, the end part 32*a* of the light-adjusting sheet 32 is caused to project further than the end surface 33*a* of the first adhesive 33 and the end surface 35*a* of the second adhesive 35. Thus, the end surface 32*b* of the light-adjusting sheet 32 is positioned away from the end surface 33*a* of the first adhesive 33 and the end surface 35*a* of the second adhesive 35 in the direction toward the outside 71 (or toward the end part 34*a* of the first transparent panel 34 and end part 36*a* of the second transparent panel 36).

By thus covering with the seal material 37 the end part 32*a* of the light-adjusting sheet 32, the end surface 33*a* of the first adhesive 33 and the 35*a* of the second adhesive 35, the moisture contained in the first adhesive 33 and the second adhesive 35 can be prevented from entering inside through the end part 32*a* of the light-adjusting sheet 32. By thus preventing the moisture present at the outside 71 of the door glass pane 30 and the moisture contained in the first and second adhesives 33, 35 from entering inside through the end part 32*a* of the light-adjusting sheet 32, entry of moisture into the light-adjusting sheet 32 can be prevented effectively.

In addition, the end part 32a of the light-adjusting sheet 32 is caused to project toward the outside 71 (toward the end parts 34a, 36a of the first and second transparent panels 34, 36). As a result, lamination of the light-adjusting sheet 32 becomes possible as far as the end parts 34a, 36a of the first and second panels 34, 36.

In a certain instance, the seal material 37 may be a transparent sealer similar to the ones used for the first and second adhesives 33, 35. In such a case, the end part 32a, covered with the seal material 37, of the light-adjusting sheet 32 can be used as a part capable of adjusting external light similarly to other parts of the light-adjusting sheet 32. As a result, a light-adjusting area or visible area can be enlarged as far as the end parts 34a, 36a of the first and second transparent panels 34, 36, whereby a sufficient field vision through the door glass pane 30.

The end part 32a of the light-adjusting sheet 32, the end surface 33a of the first adhesive and the end surface 35a of the second adhesive 35 are covered with the seal material 37. Thus, it becomes unnecessary to cover with a tape-form film as far as the end part 32a of the light-adjusting sheet 32 (namely, a region from the end surface 32b up to the front surface (that surface 32e of the one surface 32c which is proximate to the end surface 32b and that surface 32f of the opposite surface 32d which is proximate to the end surface 32b). As a result, there is no fear of the tape-form film being seen from outside, whereby an external appearance of the door glass pane 30 can be maintained in good condition. Further, by making the tape-form film unnecessary, it becomes possible to decrease the number of required parts.

The seal material 37 comprises a polymer added with a plasticizer. With the plasticizer added to the polymer, the seal material 37 is imparted with desired plastic flexibility. The seal material 37 contains a plasticizer of molecular weight higher than those of the first and second adhesives 33, 35. By thus adopting the seal material 37 containing the higher-molecular-weight plasticizer, it makes difficult for the plasticizer within the seal material 37 to move about. This renders the plasticizer contained in the seal material 37 difficult to enter inside through the end part 32a (more specifically, end surface 32b) of the light-adjusting sheet 32. A plasticizer is added to macromolecules to render resultant products pliable and easy to process.

By virtue of the light-adjusting sheet 32 having the end part 32a projecting toward the outside 71 beyond the end surfaces 33a, 35a of the first and second adhesives 33, 35, the end surface 32b of the light-adjusting sheet 32 is spaced away from the end surfaces 33a, 35a toward the outside 71. With the end part 32a of the light-adjusting sheet 32 and the end surfaces 33a, 35a of the first and second adhesives 33, 35 covered by the seal material 37, the plasticizer contained in the first and second adhesives 33, 35 can be prevented from entering inside through end part 32a of the light-adjusting sheet 32.

In the door glass pane 30 as explained above, by application of voltage to the first transparent electrode layer 42 and the second transparent electrode layer 43 of the light-adjusting sheet 32, the light-adjusting sheet 32 adjusts external light electrically. Electrical adjustment of the external light by using the light-adjusting sheet 32 results in the door glass pane 30 having desired light-adjusting capability.

As shown in FIGS. 2 and 4, the door glass pane 30 has the closure part 31 to which the end parts 34a, 36a of the first and second transparent panels 34, 36 are provided. By provision of the end parts 34a, 36a to the closure part 31, the end part 32a of the light-adjusting sheet 32 is allowed to project up to the closure part 32.

When the door glass pane 30 is slide-moved downward to open the window opening part 17, the closure part 31 of the door glass pane 30 comes away from window opening part 17 to be exposed. In this state, it is possible to extend a light-adjusting range (visible range) to the closure part 31. This improves the external appearance of the door glass pane 30 upon light-adjustment by means of the light-adjusting sheet 32.

The light-adjusting panel structure according to the present invention should not be construed as being limited to the above-described embodiment. Rather, it should be understood that alternations and improvements are possible. For example, although the light-adjusting panel structure has thus far been explained as being applied to the door glass pane 30, it may also be applied to other parts such as a roof glass pane and a sun visor.

Although, in the described embodiment, the first transparent panel 34 and the second transparent panel 36 have been described as being comprised of glass panes, they may not be limited to them and may comprise other members made of a transparent resin material Further, in the described embodiment, the first outer end surface 53 and the second outer end surface 57 have been described as being curved. However, they should not be construed as being limited to such curved shape. The first outer end surface 53 and the second outer end surface 57 may be formed to have an inclined shape.

The configurations and constructions of the vehicle, the window opening part, the door glass pane, (light-adjusting panel structure), the closure part, the light-adjusting sheet, the first adhesive, the first transparent panel, the second adhesive, the second transparent panel, the seal material, the first adhesive surface, the first inclined surface, the first outer end surface, the second adhesive, the second inclined surface and the second outer end surface described in the foregoing embodiment are not limited to the described examples and may be altered as necessary.

INDUSTRIAL APPLICABILITY

The present invention is particularly useful for application to a vehicle employing a light-adjusting panel structure which has a transparent panel bonded with a light-adjusting sheet whereby an external light can be electrically adjusted by means of the bonded light-adjusting sheet.

LIST OF REFERENCE SIGNS

10 . . . vehicle; 17 . . . window opening part; 30 . . . door glass pane (light-adjusting panel structure); 31 . . . closure part; 32 . . . light-adjusting sheet; 32a . . . end part of light-adjusting sheet; 32c . . . one surface (that surface of the light-adjusting sheet to which the first transparent panel is bonded); 32d . . . opposite surface (surface opposite from that surface of the light-adjusting sheet to which the first transparent panel is bonded); 33 . . . first adhesive; 33a . . . end surface of the first adhesive; 34 . . . first transparent panel; 34a . . . end part of the first transparent panel; 34b . . . panel surface of the first transparent panel; 34c . . . end surface of the first transparent panel; 34d . . . back surface of the first transparent panel; 35 . . . second adhesive; 35a . . . end surface of the second adhesive; 36 . . . second transparent panel; 36a . . . end part of the second transparent panel; 36b . . . panel surface of the second transparent panel; 36c . . . end surface of the second transparent panel; 36d . . . back surface of the second transparent panel; 37 . . . seal material; 51 . . . first adhesive layer; 52 . . . first inclined surface; 52a . . . end part of the first inclined surface; 53 . . . first outer end surface; 55 . . . second adhesive surface; 56 . . . second inclined surface; 56a . . . end part of the second inclined surface; 57 . . . second outer end surface

The invention claimed is:

1. A light-adjusting panel structure including a first transparent panel with a light-adjusting sheet having one surface bonded to a back surface of the first transparent panel via a first adhesive,
   wherein the light-adjusting sheet has an end part protruding, in a direction along a panel surface forming a front surface of the first transparent panel, to a position closer to an end part of the first transparent panel than an end surface of the first adhesive,
   the end part of the light-adjusting sheet and the end surface of the first adhesive are covered by a seal material having moisture permeability lower than that of the first adhesive, and
   the back surface of the first transparent panel and the one surface of the light-adjusting sheet extend substantially in parallel to each other, and the first adhesive is interposed between the back surface of the first transparent panel and the one surface of the light-adjusting sheet to extend along the back surface of the first transparent panel.

2. The light-adjusting panel structure according to claim 1, wherein a second transparent panel is bonded, via a second adhesive, to a surface of the light-adjusting sheet which is opposite from the one surface to which the first transparent panel is bonded, and the end part of the light-adjusting sheet protrudes, in a direction along a panel surface of the second transparent panel, to a position closer to an end part of the second transparent panel than an end surface of the second adhesive, the panel surface of the second transparent panel being a surface opposite to a surface of the second transparent panel bonded to the light-adjusting sheet via the second adhesive.

3. The light-adjusting panel structure according to claim 2, wherein:
   the first transparent panel is supported at a window opening part of a vehicle in such a manner as to be slidable along the window opening part for opening and closing the window opening part, and
   the end part of the first transparent panel is provided at a closure part which, when the window opening part is opened, is positioned away from a sash constituting a framework defining the window opening part and, when the window opening part is closed, is stored within the sash.

4. The light-adjusting panel structure according to claim 2, wherein the seal material bonds the first transparent panel and the second transparent panel together.

5. The light-adjusting panel structure according to claim 4, wherein:
   the first transparent panel is supported at a window opening part of a vehicle in such a manner as to be slidable along the window opening part for opening and closing the window opening part, and
   the end part of the first transparent panel is provided at a closure part which, when the window opening part is opened, is positioned away from a sash constituting a framework defining the window opening part and, when the window opening part is closed, is stored within the sash.

6. The light-adjusting panel structure according to claim 1, wherein:
   the first transparent panel is supported at a window opening part of a vehicle in such a manner as to be slidable along the window opening part for opening and closing the window opening part, and
   the end part of the first transparent panel is provided at a closure part which, when the window opening part is opened, is positioned away from a sash constituting a framework defining the window opening part and, when the window opening part is closed, is stored within the sash.

7. A light-adjusting panel structure including a first transparent panel with a light-adjusting sheet having one surface bonded to a back surface of the first transparent panel via a first adhesive, wherein:
   the light-adjusting sheet has an end part protruding, in a direction along a panel surface forming a front surface of the first transparent panel, to a position closer to an end part of the first transparent panel than an end surface of the first adhesive;
   the end part of the light-adjusting sheet and the end surface of the first adhesive are covered by a seal material having moisture permeability lower than that of the first adhesive;
   a second transparent panel is bonded, via a second adhesive, to a surface of the light-adjusting sheet which is opposite from the one surface to which the first transparent panel is bonded, and the end part of the light-adjusting sheet protrudes, in a direction along a panel surface of the second transparent panel, to a position closer to an end part of the second transparent panel than an end surface of the second adhesive, the panel surface of the second transparent panel being a surface opposite to a surface of the second transparent panel bonded to the light-adjusting sheet via the second adhesive;
   the seal material bonds the first transparent panel and the second transparent panel together;
   the first transparent panel includes: a first adhesive surface placed in contact with the first adhesive that bonds the first transparent panel to the light-adjusting sheet; and a first inclined surface inclining more toward the panel surface of the first transparent panel as the first inclined surface extends toward the end part of the first transparent panel;
   the second transparent panel includes: a second adhesive surface placed in contact with the second adhesive bonding the second transparent panel to the light-adjusting sheet; and a second inclined surface inclining more toward the panel surface of the second transparent panel as the second inclined surface extends toward the end part of the second transparent panel; and
   the first inclined surface and the second inclined surface are disposed in opposed relation to each other, the seal material being filled between the first and second inclined surfaces.

8. The light-adjusting panel structure according to claim 7, wherein:
   the first transparent panel includes a first outer end surface extending, in a direction normal to the panel surface of the first transparent panel, from an end part of the first inclined surface away from the first adhesive surface and, in the direction along the panel surface of the first transparent panel, closer toward the first adhesive surface,
   the second transparent panel includes a second outer end surface extending, in a direction normal to the panel surface of the second transparent panel, from an end part of the second inclined surface away from the second adhesive surface and, in the direction along the panel surface of the second transparent panel, closer toward the second adhesive surface, and the first outer end surface and the second outer end surface are coated with the seal material.

9. The light-adjusting panel structure according to claim 8, wherein:

the first transparent panel is supported at a window opening part of a vehicle in such a manner as to be slidable along the window opening part for opening and closing the window opening part, and the end part of the first transparent panel is provided at a closure part which, when the window opening part is opened, is positioned away from a sash constituting a framework defining the window opening part and, when the window opening part is closed, is stored within the sash.

10. The light-adjusting panel structure according to claim 7, wherein:

the first transparent panel is supported at a window opening part of a vehicle in such a manner as to be slidable along the window opening part for opening and closing the window opening part, and the end part of the first transparent panel is provided at a closure part which, when the window opening part is opened, is positioned away from a sash constituting a framework defining the window opening part and, when the window opening part is closed, is stored within the sash.

11. A light-adjusting panel structure including a first transparent panel with a light-adjusting sheet having one surface bonded to a back surface of the first transparent panel via a first adhesive, wherein:

the light-adjusting sheet has an end part protruding, in a direction along a panel surface forming a front surface of the first transparent panel, to a position closer to an end part of the first transparent panel than an end surface of the first adhesive;

the end part of the light-adjusting sheet and the end surface of the first adhesive are covered by a seal material containing a plasticizer of molecular weight higher than that of the first adhesive;

a second transparent panel is bonded, via a second adhesive, to a surface of the light-adjusting sheet which is opposite from the one surface to which the first transparent panel is bonded, and the end part of the light-adjusting sheet protrudes, in a direction along a panel surface of the second transparent panel, to a position closer to an end part of the second transparent panel than an end surface of the second adhesive, the panel surface of the second transparent panel being a surface opposite to a surface of the second transparent panel bonded to the light-adjusting sheet via the second adhesive;

the seal material bonds the first transparent panel and the second transparent panel together;

the first transparent panel includes: a first adhesive surface placed in contact with the first adhesive that bonds the first transparent panel to the light-adjusting sheet; and a first inclined surface inclining more toward the panel surface of the first transparent panel as the first inclined surface extends toward the end part of the first transparent panel;

the second transparent panel includes: a second adhesive surface placed in contact with the second adhesive bonding the second transparent panel to the light-adjusting sheet; and a second inclined surface inclining more toward the panel surface of the second transparent panel as the second inclined surface extends toward the end part of the second transparent panel; and the first inclined surface and the second inclined surface are disposed in opposed relation to each other, the seal material being filled between the first and second inclined surfaces.

12. The light-adjusting panel structure according to claim 11, wherein:

the first transparent panel includes a first outer end surface extending, in a direction normal to the panel surface of the first transparent panel, from an end part of the first inclined surface away from the first adhesive surface and, in the direction along the panel surface of the first transparent panel, closer toward the first adhesive surface, the second transparent panel includes a second outer end surface extending, in a direction normal to the panel surface of the second transparent panel, from an end part of the second inclined surface away from the second adhesive surface and, in the direction along the panel surface of the second transparent panel, closer toward the second adhesive surface, and the first outer end surface and the second outer end surface are coated with the seal material.

13. The light-adjusting panel structure according to claim 12, wherein:

the first transparent panel is supported at a window opening part of a vehicle in such a manner as to be slidable along the window opening part for opening and closing the window opening part, and the end part of the first transparent panel is provided at a closure part which, when the window opening part is opened, is positioned away from a sash constituting a framework defining the window opening part and, when the window opening part is closed, is stored within the sash.

14. The light-adjusting panel structure according to claim 11, wherein:

the first transparent panel is supported at a window opening part of a vehicle in such a manner as to be slidable along the window opening part for opening and closing the window opening part, and the end part of the first transparent panel is provided at a closure part which, when the window opening part is opened, is positioned away from a sash constituting a framework defining the window opening part and, when the window opening part is closed, is stored within the sash.

* * * * *